Sept. 2, 1941.  S. T. WILLIAMS  2,254,253
AUTOMATIC PRESSURE OPERATED VALVE
Original Filed Nov. 30, 1938
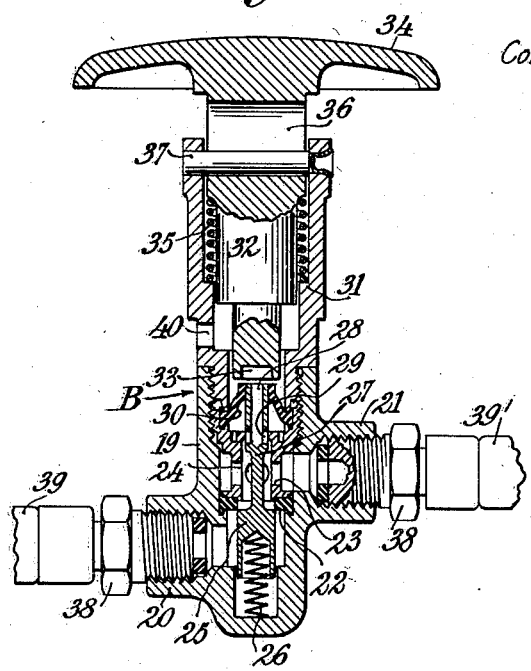
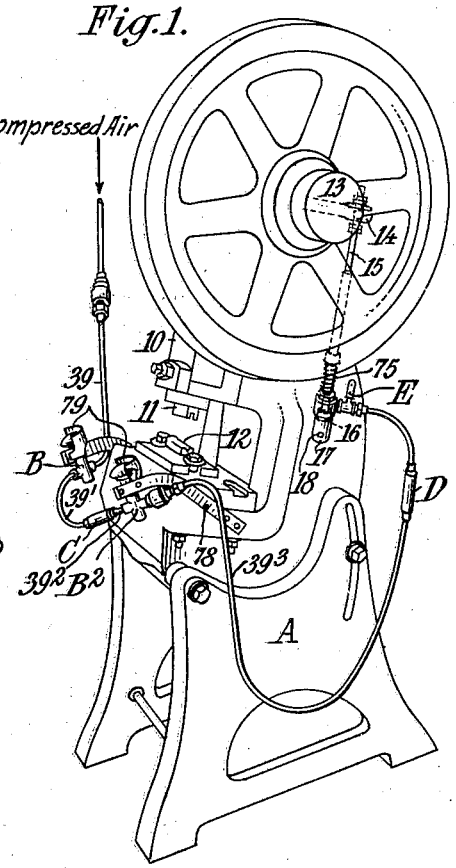
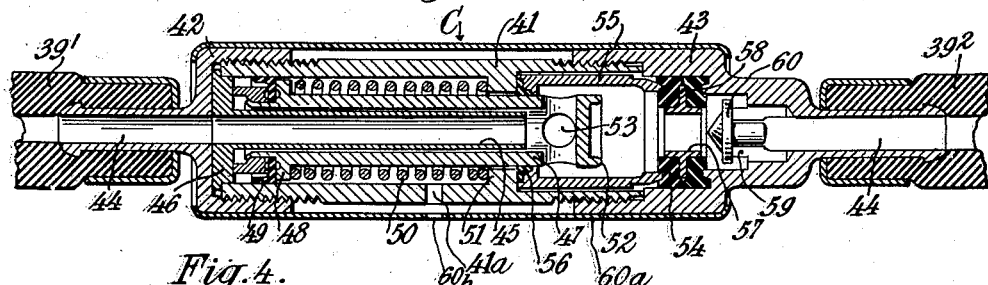
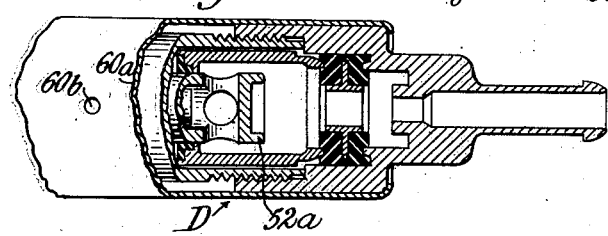
INVENTOR
Selden T. Williams
BY
Fraser, Myers & Manley
ATTORNEYS.

Patented Sept. 2, 1941

2,254,253

UNITED STATES PATENT OFFICE 2,254,253

AUTOMATIC PRESSURE OPERATED VALVE

Selden T. Williams, Bellerose, N. Y., assignor to Scovill Manufacturing Company, Waterbury, Conn., a corporation of Connecticut Original application November 30, 1938, Serial No. 243,220. Divided and this application November 29, 1939, Serial No. 306,631

9 Claims. (Cl. 137—153)

This application is a division of my prior application, Serial No. 243,220, filed November 30, 1938.

My present invention relates to an automatic pressure operated valve intended for use in safety control devices for power presses and the like, and more particularly to such safety devices which are pneumatically controlled.

The prevention of injury to press operators of power presses has long received the attention of safety engineers and labor boards and much has been done to reduce the hazards of personal injury incident to press operations. Various forms of safety appliances in the nature of safety clutches, electrical devices, and mechanical shields, have been devised, and while these have met with varying degrees of success and recognition, on the whole they have been open to one objection or another. Among the primary objections met with by these safety devices are: (1) their tendency to slow down the press operation; (2) their high installation cost; (3) their non-foolproof character; and (4) their safety characteristics could be circumvented by an operator who desired to speed up production.

My present invention provides an automatic pressure operated valve as an essential element of a safety device for power presses and the like which overcomes the various objections and limitations above mentioned. In its underlying concept my invention embodies a novel form of cutout valve which relies upon compressed air to operate a plunger for tripping a clutch on the drive shaft of the press or for operating an equivalent means, and a plurality of control valves so disposed with relation to the operating head of the press that both hands of an operator must be used to operate said valves and be well away from danger when doing so; and further, said valves are shielded so that they can not be accidentally operated. My invention is capable of installation on machines that are equipped with either non-repeat or repeating type clutches.

The principle, construction and operation of my invention will be better understood from the detailed description which follows when considered in connection with the accompanying drawing which show a practical embodiment of my invention, and wherein:

Fig. 1 is a perspective view of a power press showing my invention applied thereto.

Fig. 2 is a longitudinal section through one of the manually operable valves forming a part of my invention.

Fig. 3 is an axial section through an automatic pressure operated cut-out valve forming the essence of the claimed subject matter herein.

Fig. 4 is a fractional view of a slightly modified form of automatic operated pressure cut-out valve.

Although my invention is capable of use with any type of press or machine which has a movable head adapted to move toward and away from a complemental member and between which members the hands of an operator must be positioned in the handling of the work to be operated upon by the machine, I have shown my safety device applied to a power press A of conventional design having a movable head 10 which carries a die 11 for cooperation with a complemental die 12 mounted on the base of the press. The head 10 is reciprocable so as to bring the dies 11 and 12 into operative position to the work being acted upon, and reciprocation of the head 10 is provided by rotation of the shaft 13 upon which is mounted a clutch (not shown) of any approved type. As herein shown, the clutch is adapted to be tripped by a clutch trip 14 carried by a rod 15, one end of which carries a piston 16 mounted in a cylinder 17 which is shown as pivotally mounted at 18 to the press frame.

For operating the clutch trip only when the hands of the operator are well away from danger, I have provided a pair of manually operable valves B and B² and a cut-out valve C which form part of a pneumatic circuit adapted to establish fluid communication between the interior of the cylinder 17 with a source of compressed air. In Fig. 1 of the drawing I have shown included in the pneumatic circuit, a cut-out valve C, a second cut-out valve D, and a relief valve E. The structures and functions for the valves B, B², C, D and E, will be presently described.

The manually operable valves B and B² are identical in construction and each consists of a hollow casing 19 having lateral tubular offsets or projections 20 and 21 providing induct and educt openings, respectively, in the casing. Within the casing between the lateral offsets is a shoulder upon which is mounted a valve packing seat 22 which is held in place by a tubular plug 23 having lateral openings 24 therein, the said plug being screw-threadedly or otherwise held in position within the casing. Mounted within the casing for engagement with the packing seat 22 is a valve check member 25, the lower portion of which is hollowed out and encloses a helical spring 26 for normally holding the valve against its seat. The valve check 25 above the seating portion thereof is formed with an axial pin 27, the upper end 28 of which is of tubular form and of a diameter to snugly slide through the axial opening in the tubular plug 23, and said tubular portion of the pin, at its lower end, is formed with lateral openings 29. To insure against leakage and to provide an air seal between the top of the tubular plug 23 and the top of the hollow portion 28 of the valve pin 27, I connect said parts together by a truncated cone-shaped tubular packing 30. Any suitable means may be employed for holding this packing in contact with said parts, and as herein shown, the packing which is formed as a separate part has a sliding fit with the hollow portion of the valve check pin and is held in clamping engagement with the tubular plug 23 by a tubular member 31 which screw-threadedly engages within the casing 19. Mounted for telescopic movement within the tubular member 31 is a plunger 32, the inner end of which is recessed as at 33 to engage over and seal the open end of the hollow portion of the valve check pin when the plunger is depressed in the act of unseating the valve check 25. The plunger 32 is of a length to extend beyond the top of the tubular member 31 and is normally urged outwardly by a helical spring 35 mounted between a shoulder within the tubular member 31 and a shoulder on the plunger 32. For limiting the extent of the plunger movement and for holding it against separation from the tubular member 31, the plunger is formed with a slot 36 through which extends a pin 37 carried by the tubular member. For facilitating movement of the plunger by the hand of an operator, the plunger at its outer end is provided with an enlarged mushroom head 34. The tubular lateral offsets 20 and 21 are each threaded for connection with screw-threaded nipples 38, to which are attached sections of hose or flexible conduits 39, 39¹, 39², and 39³, forming a part of the pneumatic circuit. The tubular member 31 is also formed with a lateral opening or vent 40 which, it will be observed, provides open communication through the tubular portion 28 of the valve check pin and the lateral openings 24 in the tubular plug 23, with the bore through the lateral offset 21, the educt opening of the valve B, when the check valve 25 is seated. When the valve check 25 is unseated it will be appreciated that this open communication is cut off by the seal provided by the engagement of the lower end of the plunger 32 with the coned packing 30.

The automatic pressure operated cut-out valve C consists of a casing formed of a central substantially cylindrical tubular element 41, the ends of which are screw-threadedly connected to tubular end members 42 and 43, each of which terminates in an outwardly-directed nipple 44 to which an end of the conduits 39¹ and 39² are suitably connected. Mounted within the casing provided by the elements 41, 42, and 43, is a tubular member 45 having a bore substantially flush with the bore through the nipple end of the element 42 and having an outwardly directed flange 46 which is clamped against a flat surface in the element 42 by the screw-threaded connection between said elements 41 and 42. Surrounding the tubular element 45 in slightly spaced relation thereto is a tubular plunger check valve 47 which at its end adjacent the flange 46 is formed with a flange 48 and carries a piston packing 49 having a diameter to air- tightly move within the cylindrical bore of the element 41.

Surrounding the plunger check valve 47 and bearing at one end against the flange 48 is a helical spring 50, the opposite end of which bears against an inwardly-directed flange 51 on the tubular element 41 for the purpose of exerting a force upon the plunger valve for normally holding it in its unseated position as shown in Fig. 3. The plunger valve 47 at its other end is closed and formed with an annular ring 52 rearwardly of which the plunger valve is formed with lateral openings 53 leading from the interior of the tubular plunger to the duct through the cut-out valve. The closed end 52 of the plunger valve is adapted to engage a valve seat packing 54 mounted within the tubular element 43 and held therein by a sleeve 55 which is clamped between the annular flange 51 and said packing in the assembly of the elements 41 and 43, there being also provided a packing 56 between the sleeve 55 and the flange 51, which packing engages the outer wall of the plunger valve 47 to provide an air-tight seal therewith. The packing 54 consists of two washers which are pressed over a tubular sleeve 57 having an outwardly-directed flange or rib 58 intermediate its ends. The element 43 between the nipple 44 thereon and the packing 54 therein is formed with a chamber having a spider 59 for guiding the stem of a floating valve 60, the face thereof which engages the packing 54 being of conical form and of smaller effective area than the opposite face of said valve. The function for this construction will presently be explained. To prevent tampering with the cut-out valve parts, they are housed within a shell 60a having a vent opening 60b. The tubular element 41 also has a vent opening 41a for permitting the venting of any air under pressure which may find its way into said element.

The cylindrical space between the tubular element 45 and the tubular stem of the check valve 47 provides a restricted air passage leading from the bore of plunger valve stem 47 to the side of the piston (flange 48 and packing 49) opposite to that on which the force of the spring 50 acts. This restricted passage functions to provide a delayed pressure effect of the incoming air from the duct to the piston which operates to move the piston against the force of the spring 50 to seat the closed end 52 of the plunger valve 47 on the seat 54 after an initial blast or puff of compressed air has passed through the duct.

The cut-out valve D, shown in Fig. 4, is similar in all respects to the valve C above described except that the cut-out valve D does not have a valve therein corresponding to the floating valve 60.

The relief valve E may be of any approved form and its primary function is to provide an adjustable vent for the venting of air from the cylinder 17. Mounted on the rod 15 is a compression spring 75, the compressibility of which may be adjusted in any approved manner.

The manually operable valves B and B² may be conveniently attached to the machine by means of brackets 78 which are bolted to the ends of the bed of the press. These brackets may also conveniently carry shields 79 which extend above and partially encircle the mushroom heads 34 of the valves B.

The device hereinbefore described is capable of operation for tripping a clutch of either the non-repeat or the repeating type. When used with a non-repeat or single stroke clutch the cut-out valve D and the vent valve E can be dispensed with and a direct hose connection may be provided between the right hand operating valve B² and the cylinder 17. Alternatively, the same end may be accomplished by merely closing the vent in the vent valve E. When the safety device is to be used with a repeat type clutch the vent in the valve E is opened to allow for venting of the cylinder.

*Operation.*—With a safety device as illustrated and hereinbefore described, when used with a non-repeat type clutch, the procedure and operation are as follows:

The right hand operating valve B² must be pressed down slightly in advance of the left hand operating valve B or simultaneously therewith. When this is done the compressed air from the source passes through the pneumatic circuit into the cylinder 17 and forces the piston therein (not shown) downwardly, which action trips the clutch and operates the press. When the operating valves B and B² are opened in the manner specified, a puff or blast of air first passes through the pneumatic circuit to act upon the piston, and after so acting, the delayed pressure effect of the incoming air pressure as hereinbefore explained operates to move the plunger valve 47 out of the cut-out valve C so that the ring 52 seats against the seat 54, and said valve will remain seated so long as the left hand operating valve B is held open. When the hand is removed from the left hand operating valve B, the check valve 25 therein will seat under the force of the spring 26, the compressed air entrapped in the cut-out valve C will vent through the opening 40 in the valve B and permit the plunger valve 47 to unseat under the force of spring 50. When the hand is removed from the right hand operating valve B², the air from the cylinder 17 will vent through the opening 40 in said valve. As the air is released from the cylinder 17 the clutch trip 14 is returned to its operating position and the press can not again operate until the clutch is again tripped.

If either of the manually operable valves B or B² is tied down or held down, the cut-out valve C functions to prevent the piston in the cylinder from operating the clutch, because, as above described, if the left hand valve B is held down, the plunger valve 47 will remain seated and prevent the passage of air through the pneumatic circuit to the cylinder, while if the right hand operating valve B² is held down, the press will operate once; and once only, as the check valve 60 of cut-out valve C holds the air in the cylinder 17 and will not let it escape. Furthermore, as the effective area of the valve 60 acted upon by the trapped back pressure in cylinder 17 is greater than the effective area of the seating face of said valve, it will be apparent that the incoming air through the cut-out valve C upon unseating of valve B will be insufficient to unseat the valve 60.

Where the safety device is used with a repeating type clutch, the action is substantially the same as with the non-repeat clutch above described, except that the air from the cylinder is vented through the relief valve E, and this takes place before a second press operation. In this connection if either of the valves B or B² are tied down or held down, the press would not again trip because if the left hand valve B is held down the valve 52 of the cut-out valve C will remain closed and prevent the admission of air to the cylinder 17, while if the right hand valve B² is held down, the valve plunger 52a in the cut-out valve D will be held closed, since the compressed air entrapped between the check 60 in the cut-out valve C and the valve 52a of the cut-out valve D will operate to hold said valve 52a upon its seat.

It will thus be seen that the safety device is effective to prevent press operation if any attempt is made by the press operator to have one of his hands free during the tripping of the press.

The safety device, it will be understood, is subject to modification in constructional features and to various uses within the range of engineering skill, without departing from the spirit of the invention.

What I claim is:

1. An automatic pressure operated valve, comprising a casing having a normally open duct therethrough, a valve seat in said duct facing the pressure entering end of the duct, a piston check valve movable within said duct and movable in the direction of the admitted pressure fluid to engage the valve seat to close said duct upon admission of compressed air to said duct, a spring normally acting upon said check valve to hold it in unseated position, and means for applying delayed pressure effect from said duct to the piston for moving the piston to seat the valve after a blast of compressed air has passed through the duct.

2. An automatic pressure operated valve according to claim 1, wherein the piston check valve has a hollow valve stem, one end of which carries the piston and the other end of which is closed and provided rearwardly of said closed end in respect to the direction of the admitted compressed air with lateral openings leading from the hollow interior to the duct wherein the means for applying delayed pressure effect from the duct to the piston is provided by a restricted passage formed by a tubular member of smaller diameter than the hollow valve stem extending thereinto.

3. An automatic pressure operated valve according to claim 1, wherein the casing is of substantially cylindrical form with the duct extending axially therethrough, and the check valve is axially movable therein and having a hollow axial stem, one end of which carries the piston and the other end of which is closed and provided rearwardly of said closed end in respect to the direction of the admitted compressed air with lateral openings leading from the hollow interior to the duct, and wherein the means for applying delayed pressure effect for moving the piston to seat the valve consists of a restricted passage leading from the duct to the piston side of the check valve.

4. An automatic pressure operated valve comprising a casing having a normally open duct therethrough, a fixed valve seat in said duct facing the pressure entering end of the duct, a piston check valve movable within said duct and adapted to engage the valve seat to close said duct upon admission of compressed air to said duct, a second check valve in said duct beyond the piston check valve in respect to the direction of flow of the pressure adapted to normally open upon admission of compressed air, a spring acting upon the first check valve to normally hold it in unseated position, and said casing having a passage therein leading from said duct to the piston side of the first check valve opposed to that on which the force of the spring acts to hold the valve unseated, and adapted to admit air under pressure to act upon the piston to seat the first check valve immediately after an initial blast of compressed air has passed through the duct.

5. An automatic pressure operated valve according to claim 4, wherein the second check valve is longitudinally spaced from the first check valve and has a smaller effective area on its face exposed to the admitted compressed air than on its opposite face.

6. An automatic pressure operated valve comprising an elongate casing having a normally open duct therethrough, a fixed valve seat in said duct facing the pressure entering end of the duct, a plunger valve movable in said duct, said plunger valve having a hollow stem, the end of said stem remote from the pressure entering end of said duct being closed and adapted to seat upon the valve seat to close the duct, said hollow steel rearwardly of said closed end being formed with lateral openings establishing communication between the hollow stem and the duct, the other end of said hollow stem having a piston slidably engaging the inner wall of the duct in the casing, a coil spring encircling the hollow stem and bearing at one end against a fixed abutment within the casing and at its other end against an abutment on the hollow stem and operative to urge the plunger valve to its unseated position, and a restricted fluid by-pass leading from the hollow stem to the side of the piston opposite to that on which the force of the spring acts to hold the plunger valve unseated, the admission of air under pressure from the hollow stem through the by-pass to the piston providing a delayed pressure effect on the piston operative against the force of the spring to seat the plunger valve on its seat and hold it there after a blast of air has passed through the duct, until the air pressure on the piston is relieved.

7. An automatic pressure operated valve according to claim 6, wherein the by-pass between the hollow stem and the piston is provided by a passage formed between a tubular extension on the casing which extends a substantial distance inwardly within the hollow stem of the plunger valve.

8. An automatic pressure operated valve according to claim 6, wherein the casing comprises a substantially cylindrical body portion, a seperable end portion secured to each end of the body portion, and a separate interior sleeve, the various portions of the casing serving to hold the various mentioned parts within the casing in assembled relation.

9. An automatic pressure operated valve according to claim 6, wherein the casing comprises a substantially cylindrical body portion, a seperable end portion secured to each end of the body portion, and a separate interior sleeve extending into the hollow stem of the plunger valve to provide the fluid by-pass to the side of the piston opposite to that on which the spring acts, the various portions of the casing serving to hold the various mentioned parts within the casing in assembled relation, and a non-removable shell enclosing the casing for holding the valve parts in assembled relation against unauthorized change.

SELDEN T. WILLIAMS.

CERTIFICATE OF CORRECTION.

Patent No. 2,254,253. September 2, 1941.

SELDEN T. WILLIAMS.

It is hereby certified that error appears in the printed specification of the above numbered patent requiring correction as follows: Page 4, first column, line 21, claim 6, for the word "steel" read --stem--; and that the said Letters Patent should be read with this correction therein that the same may conform to the record of the case in the Patent Office.

Signed and sealed this 21st day of October, A. D. 1941.

(Seal)

Henry Van Arsdale,
Acting Commissioner of Patents.